US007076523B2

(12) United States Patent
Schneider et al.

(10) Patent No.: US 7,076,523 B2
(45) Date of Patent: Jul. 11, 2006

(54) INTERACTION INTERFACE FOR A COMPOSITE DEVICE COMPUTING ENVIRONMENT

(75) Inventors: Georg J. Schneider, Merzig (DE); Stuart Goose, Princeton, NJ (US); Safia Djennane, North Brunswick, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 664 days.

(21) Appl. No.: 10/131,714

(22) Filed: Apr. 24, 2002

(65) Prior Publication Data

US 2003/0204558 A1 Oct. 30, 2003

(51) Int. Cl.
G06F 15/16 (2006.01)

(52) U.S. Cl. ............... 709/203; 709/217; 709/219; 709/229; 709/249; 715/700; 715/866; 345/418; 345/629

(58) Field of Classification Search ........... 709/201, 709/217, 219, 227, 229, 249, 250, 203; 715/700, 715/744, 866; 455/406, 414.1, 422.1, 426.1, 455/432.1; 345/629, 418; 379/114.1

See application file for complete search history.

(56) References Cited

U.S. PATENT DOCUMENTS

| 5,555,376 | A | * | 9/1996 | Theimer et al. ............. 709/229 |
| 6,115,754 | A | * | 9/2000 | Landgren ...................... 709/249 |
| 6,128,487 | A | * | 10/2000 | Wiedeman ................ 455/426.1 |
| 6,195,545 | B1 | * | 2/2001 | Baker et al. ............. 455/414.1 |
| 6,216,158 | B1 | * | 4/2001 | Luo et al. ..................... 709/217 |
| 6,243,104 | B1 | * | 6/2001 | Murray ........................ 345/629 |
| 6,252,952 | B1 | * | 6/2001 | Kung et al. .............. 379/114.1 |
| 6,278,448 | B1 | * | 8/2001 | Brown et al. ................ 715/866 |
| 6,362,836 | B1 | * | 3/2002 | Shaw et al. .................. 715/744 |
| 6,421,716 | B1 | * | 7/2002 | Eldridge et al. ............ 709/219 |
| 6,430,409 | B1 | * | 8/2002 | Rossmann ................ 455/422.1 |
| 6,442,589 | B1 | * | 8/2002 | Takahashi et al. .......... 709/203 |
| 6,453,361 | B1 | * | 9/2002 | Morris ........................ 709/250 |
| 6,466,232 | B1 | * | 10/2002 | Newell et al. .............. 715/700 |
| 6,493,760 | B1 | * | 12/2002 | Pendlebury et al. ........ 709/229 |
| 6,542,740 | B1 | * | 4/2003 | Olgaard et al. .......... 455/432.1 |
| 6,629,151 | B1 | * | 9/2003 | Bahl .......................... 709/250 |
| 6,728,750 | B1 | * | 4/2004 | Anderson et al. ........... 709/201 |
| 6,745,022 | B1 | * | 6/2004 | Knox .......................... 455/406 |

(Continued)

FOREIGN PATENT DOCUMENTS

WO         WO 01/95127         12/2001

(Continued)

OTHER PUBLICATIONS

Nilsson et al., "Composite Capabilities/Preferences Profiles: Requirements and Architecture", W3C Working Draft, Jul. 21, 2000, W3C, 35 pages.*

(Continued)

*Primary Examiner*—Thong Vu
*Assistant Examiner*—Hai Van Nguyen
(74) *Attorney, Agent, or Firm*—Donald B. Paschburg; F. Chau & Associates, LLP

(57) ABSTRACT

A general interaction interface system comprises a composite device access point connected to a client device, wherein the composite device is adapted to receive a request from the client device. The system further comprises a composite device gateway connected to the composite device access point, wherein the composite device gateway determines content and delivery parameters based on interaction primitives of the composite device access point, and a composite device resource, selected by the composite device gateway, for servicing the request of the client device.

10 Claims, 2 Drawing Sheets

U.S. PATENT DOCUMENTS 6,857,021 B1 * 2/2005 Schuster et al. ............ 709/227

FOREIGN PATENT DOCUMENTS

WO      WO 02/23857      3/2002

OTHER PUBLICATIONS

Pham et al., "Exploiting Location-Based Composite Devices To Support And Facilitate Situated Ubiquitous Computing", Siemans Corp. Research, Inc., HUC200, 1927, pp. 143-156, 2000.*

Pham et al., ASituated Computing Framework For Mobile And Ubiquitous Multimedia Access Using Small Screen And Composite Devices:, ACM Multimedia 2000, pp. 323-331.*

Pham et al., "Composite Device Computing Environment: A Framework For Situated Interaction Using Small Screen Devices", Personal and Ubiquitous Computing 2001, Springer-Verlag London, Ltd., 4 pages.*

Goose et al., "Sreaming Speech: A Framework For Generating And Streaming 3D Text-To-Speech And Audio Presentations TO Wireless PDAs as Specified Using Extensions to SML", www 2002, May 7-12, 2002, AMC, pp. 37-43.*

Goose et al., "Toward Imrpoving The Mobile Experience With Proxy Transcoding And Virtual Composite Devices For A Scalable Bluetooth LAN Access Solution", MDM 2002, IEEE 2002, 2 pages.*

Mansfield et al., "Charting Networks In THe X.500 Directory", Network Working Group, RFC 1609, Mar. 1994, 11 pages.*

* cited by examiner

INTERACTION INTERFACE FOR A COMPOSITE DEVICE COMPUTING ENVIRONMENT

BACKGROUND OF THE INVENTION

1. Field of the Invention

The present invention relates to device networking, and more particularly to a system and method for an interface for interacting with a composite device.

2. Discussion of Related Art

The World Wide Web (WWW) continues to evolve, facilitating a digital society. Wireless technology is an important area in the evolution of the WWW. Wireless connections allow an increasingly peripatetic society to remain connected. As a consequence, mobile computing is a growth area and the focus of much energy. Mobile computing includes applications and services for information access, communication and collaboration across a diverse range of environments.

Research activities in the field of situated computing consider factors such as a user's identity, profile, location, etc., for imbuing applications and services with more personal and appropriate behavior.

Contemporary wireless solutions for accessing Internet Protocol (IP) based resources include, inter alia, personal digital assistants (PDAs) and notebooks using cellular modems, connected to wireless networks. However, the devices, networks, protocols and content are likely to change as the technologies mature. Typically, popular mobile devices are sized to fit conveniently into a clothes pocket. Although screen resolution may improve, the desirability of a compact device will continue to limit the screen size. For example, to display information on palmtop devices, information can be tailored and shrunk to fit the device, which can result in information loss.

Therefore, a need exists for a system and method for an interface for interacting with a composite device.

SUMMARY OF THE INVENTION

According to an embodiment of the present invention, a general interaction interface system comprises a composite device access point connected to a client device, wherein the composite device is adapted to receive a request from the client device. The system further comprises a composite device gateway connected to the composite device access point, wherein the composite device gateway determines content and delivery parameters based on interaction primitives of the composite device access point, and a composite device resource, selected by the composite device gateway, for servicing the request of the client device.

The composite device resource is connected to a network comprising the composite device gateway and the composite device access point. The composite device resource is one of a personal computer, a monitor, a telephone and a printing device.

The composite device access point comprises a system entry server connected to the client device, wherein the system entry server comprises a common resource repository comprising graphical user interaction resources, wherein the graphical user interaction resources are accessible by the client device, and a mapper for mapping input of the client device to an interaction primitive.

The client device includes one of a personal digital assistant, an Internet capable telephone and a notebook computer.

The client device comprises a graphical user interface, a communication means for interacting with the composite device access point through the connection and a means for controlling the operations of the composite device resource. The means for controlling the operations of the composite device is handled by an operating system of the client device.

The composite device gateway further comprises, a composite device repository connected to the system entry server, and a service and content server in parallel with the composite device repository to the system entry server.

The composite device gateway further comprises a media-composite device manager connected to a composite device repository and a service and content server, the media-composite device manager for controlling the composite device resource for the client device.

The composite device gateway further comprises a content adaptation module connected to a media-composite device manager, a content delivery handler connected to a content adaptation module, and an application manager connected to the content delivery handler for controlling an invoked application on an output device, given an interaction primitive of a system entry server.

According to an embodiment of the present invention, a general interaction interface comprises a system entry server for interacting with a mobile device through a network. The system entry server comprises, a server connected to the mobile device, a common resources repository connected to the server comprising graphical user interaction resources, wherein the graphical user interaction resources are accessible by the mobile device, and a mapper for mapping input from the mobile device to an interaction primitive.

The general interaction interface is implemented in the system entry server providing an entry point to a composite device computing environment.

The composite device computing environment further comprises a composite device repository connected to the system entry server, a service and content server in parallel with the composite device repository to the system entry server, and a media-composite device manager connected to the composite device repository and the service and content server. The composite device computing environment comprises a content adaptation module connected to the media-composite device manager, a content delivery handler connected to the content adaptation module, and an application manager connected to the content delivery handler for controlling an invoked application on an output device, given the interaction primitive of the system entry server.

The composite device repository comprises information about a composite device computing environment.

The service and content server serves content to a composite device computing environment available to service a request of the mobile device.

The media-composite device manager receives information from the composite device repository and the service and content server, wherein the media-composite device manager controls a composite device computing environment for the mobile device.

The content adaptation module prepares the content for a device of a composite device computing environment, wherein the device is selected by the media-composite device manager.

The content delivery handler receives adapted content.

The application manager receives the interaction primitives and controls an application invoked by the mobile device.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
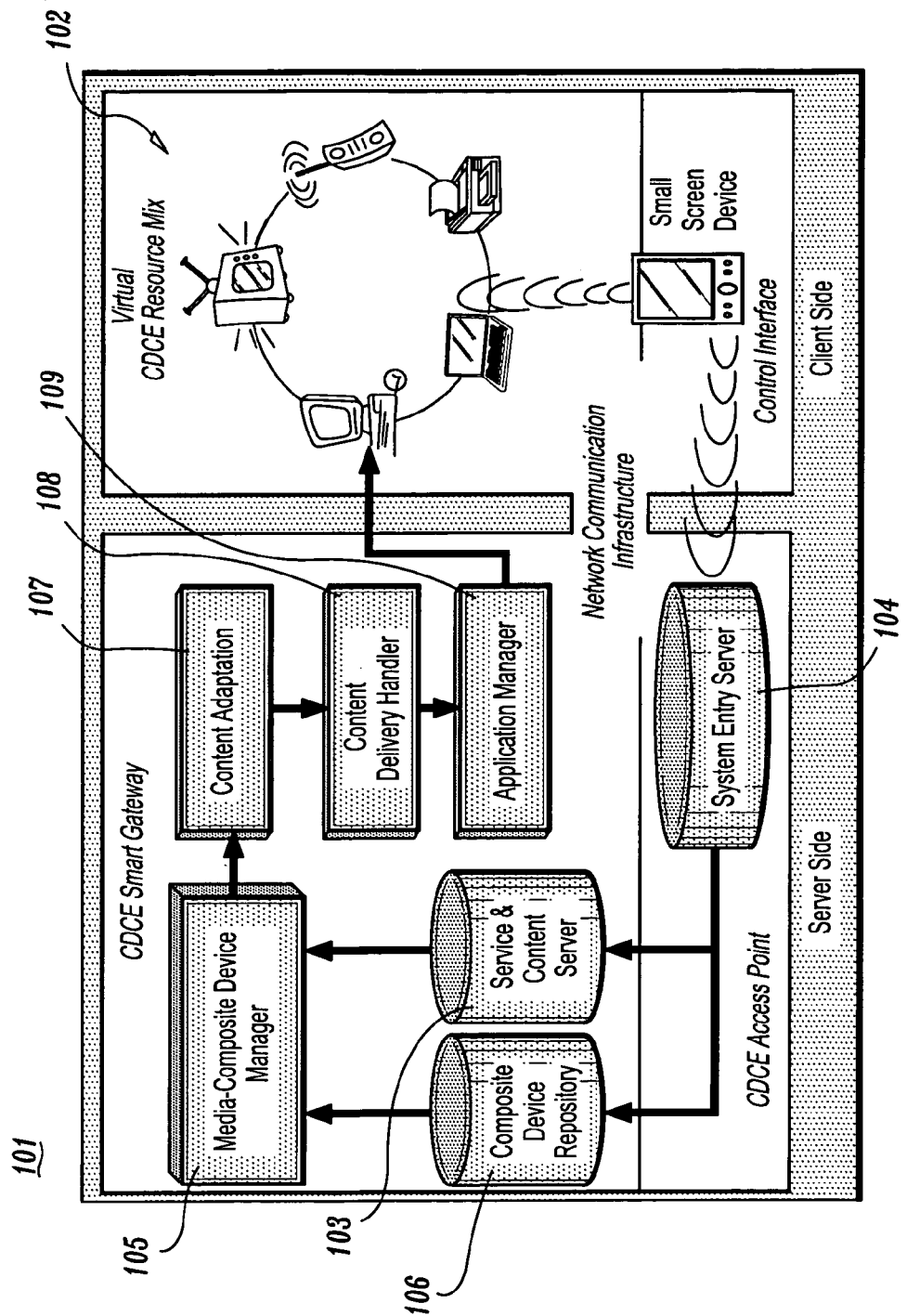
FIG. 1 is a schematic diagram of a composite device computing environment according to an embodiment of the present invention.

Referring to FIG. 1, the composite device computing environment 101 comprises a system for accessing multimedia content and diverse services using a mobile device.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM) and input/output (I/O) interface(s). The computer platform also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The composite device computing environment can utilize arbitrary computing and output devices 102, such as personal computers, television sets, printers, etc., that are available in the surrounding environment to perform information and/or service requests. Thus, a mobile device can serve as an interface to access services, such as electronic mail, video conferencing, media streaming services, etc. These services are made available on a server 103. The mobile device can be used to determine suitable devices in the vicinity that can be exploited to redirect needed services to an appropriate output device.

According to an embodiment of the present invention, one task of a general interaction interface is to provide a generic server side interface located in the System Entry Server 104 to control and to interact with the invoked services on the output devices 102. This can be important for devices with only basic input capabilities, such as some televisions. The system and method support the use of different types of mobile devices with diverse capabilities and heterogeneous user interfaces ranging from cellular telephones including small displays and limited input capabilities to Wireless Application Protocol (WAP) devices/telephones including larger displays and WAP browser capabilities, to PDAs including larger displays and a wide range of software.

The general interaction interface provides a way to use several devices and/or interfaces customized for each individual mobile device type to access the composite device computing environment functionally. Such a general interaction interface allows users to access the same range of deployed composite device computing environment services and interact with different output devices. A service request can be received at a system entry server 104. The system entry server 104 parses the request into an input to a composite device repository 106 and a service and content server 103. The composite device repository 106 includes information about the devices available to service the request. The service and content server 103 serves content to the devices available to service the request. A media-composite device manager 105 receives information from the composite device repository 106 and the service and content server 103. The media-composite device manager 105 orchestrates the devices for each individual mobile device. A content adaptation module 107 prepares the content for one or more devices selected by the media-composite device manager 105, for example, by scaling an image or converting a document to a format readable by a personal computer having certain software. A content delivery handler 108 can be connected to receive adapted content. The content delivery handler 108 can handle, for example, the timing of content delivery. An application manager 109 monitors the devices. The application manager 109 can build any-to-any configurations. The application manager 109 can start, stop and move applications among the devices 102 selected by the media-composite device manager.

Figure 2:
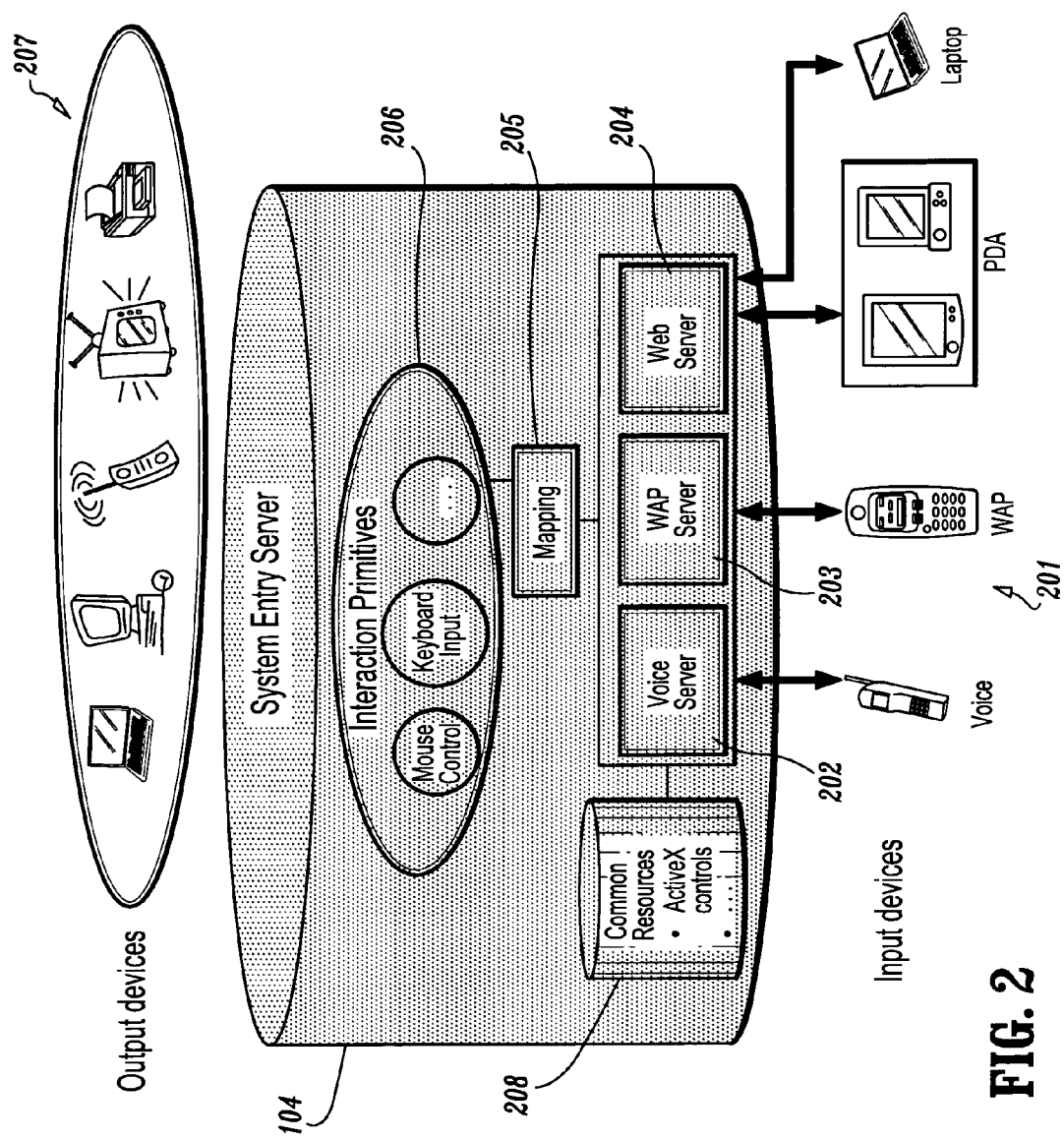
FIG. 2 is a schematic diagram of a general interaction interface according to an embodiment of the present invention.

FIG. 2 illustrates a general interaction interface architecture according to an embodiment of the present invention. The System Entry Server 104 provides specific entry points for the different devices 201 that shall interact with the composite device computing environment 207. The System Entry Server 104 can include, for example, a voice server 202 for interacting with cellular telephones, a WAP server 203 for interacting with WAP devices and a Web server 204 of interacting with PDA's, laptops, Web tablets and other devices that have a web browser. A common resource database 208 can be provided. The common resource database comprises, for example, ActiveX controls. The input from the interaction servers can be passed through a mapping component 205, which maps the user input to the different interaction primitives 206, like mouse input or keyboard input. These interactions primitives 206 work closely together with the Application Manager, which controls the invoked application on the output devices 207.

The Common Resources include specialized Graphical User Interface (GUI) resources, for example, domain adapted user interfaces for mobile Devices. An example of a GUI is a simplified mobile user interface, for example for the PalmPilot® operating system for, interacting with, e.g., a graphics program. The user interface can include, for example, buttons for "Start Slide Show" "Stop Slide Show", "Forward", "Backward" and a field for "Pointing" and "Annotation".

It is possible to offer the complete input and control functionality of an invoked application, for example, by providing controls from a common resources server 208. The functionally can be mapped using an ActiveX control running with a web browser on the mobile device. Mouse pointing and annotation can be accomplished with, for example, a stylus. Textual input can be accomplished via a soft keyboard, a keystroke alphabet, or voice commands.

The WAP interface can offer similar input and control capabilities as the Web interface. The GUI can be adapted to the specific display size of the WAP device. Input of letters can be accomplished using alpha mode of the WAP phone. The mouse pointer can be controlled using roller and select keys. Equivalent considerations apply for I-mode phones.

Having described embodiments for a system and method for interacting with a composite device, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A general interaction interface system comprising:
    a composite device access point connected to a client device, wherein the composite device is adapted to receive a request from the client device;
    a composite device gateway connected to the composite device access point, wherein the composite device gateway determines content and delivery parameters based on interaction primitives of the composite device access point; and
    a composite device resource, selected by the composite device gateway, for servicing the request of the client device,
    wherein the composite device access point comprises a common resource database and a mapping component, wherein the common resource database comprises controls executed by a web browser of the client device for receiving input from the client device, and wherein the input is mapped by the mapping component to the interaction primitives for controlling a component device resource via the composite device gateway.

2. The system of claim 1, wherein the composite device resource is connected to a network comprising the composite device gateway and the composite device access point.

3. The system of claim 1, wherein the composite device resource is one of a personal computer, a monitor, a telephone and a printing device.

4. The system of claim 1, wherein the composite device access point comprises a system entry server connected to the client device, wherein the controls comprise a common resource repository comprising graphical user interaction resources, wherein the graphical user interaction resources are accessible by the client device.

5. The system of claim 1, wherein the client device includes one of a personal digital assistant, an Internet capable telephone and a notebook computer.

6. The system of claim 1, wherein the client device comprises:
    a graphical user interface;
    a communication means for interacting with the composite device access point through the connection; and
    a means for controlling the operations of the composite device resource.

7. The system of claim 6, wherein the means for controlling the operations of the composite device is handled by an operating system of the client device.

8. The system of claim 1, wherein the composite device gateway further comprises:
    a composite device repository connected to the system entry server; and
    a service and content server in parallel with the composite device repository to the system entry server.

9. The system of claim 1, wherein the composite device gateway further comprises a media-composite device manager connected to a composite device repository and a service and content server, the media-composite device manager for controlling the composite device resource for the client device.

10. The system of claim 1, wherein the composite device gateway further comprises:
    a content adaptation module connected to a media-composite device manager;
    a content delivery handler connected to a content adaptation module; and
    an application manager connected to the content delivery handler for controlling an invoked application on an output device, given an interaction primitive of a system entry server.

* * * * *